United States Patent [19]

Gwon

[11] Patent Number: 4,692,823
[45] Date of Patent: Sep. 8, 1987

[54] TAPE LOADING DEVICE FOR A VIDEO TAPE RECORDER

[75] Inventor: Seong T. Gwon, Seoul, Rep. of Korea

[73] Assignee: Goldstar Co., Ltd., Seoul, Rep. of Korea

[21] Appl. No.: 749,647

[22] Filed: Jun. 28, 1985

[30] Foreign Application Priority Data

Jun. 30, 1984 [KR] Rep. of Korea ..................... 3765/84

[51] Int. Cl.$^4$ ..................... G11B 15/61; G11B 15/665
[52] U.S. Cl. ..................................................... 360/85
[58] Field of Search ......................................... 360/85

[56]  References Cited

U.S. PATENT DOCUMENTS 4,561,029 12/1985 Maeda ................................... 360/85

FOREIGN PATENT DOCUMENTS

0218067 12/1983 Japan ..................................... 360/85

Primary Examiner—Robert S. Tupper
Attorney, Agent, or Firm—Birch, Stewart, Kolasch & Birch

[57] ABSTRACT

A tape loading device for a video tape recorder enabling the traveling load of tape to be minimum and thereby the travel of tape to be smooth and stable throughout the traveling system, wherein among several guide posts arranged around an inclined rotary head drum to guide a drawing and traveling path of the tape, only one is a fixed post which is inclined with respect to the direction of the traveling tape and disposed at an outer area between the tape supplying side of the tape cassette and the tape inlet side of the rotary drum, while the remainder are rotatable posts which are vertically disposed with respect to the direction of the traveling tape.

4 Claims, 7 Drawing Figures

TAPE LOADING DEVICE FOR A VIDEO TAPE RECORDER

BACKGROUND OF THE INVENTION

The present invention relates to a tape loading device for a tape recorder including a rotary magnetic head drum such as a video tape recorder or a digital audio tape recorder.

As is well known, conventional video tape recorders are classified into a "U" loading type one and an "M" loading type according to the shape of the travelling path of tape. The "U" loading type recorders are classified again into an old one and a new one.

The travelling load actuated on the tape is largest in the case of the "M" loading type recorder. The next one is the new "U" loading type recorder. The old "U" loading type recorder is subjected to a smaller load and therby known as the most stable and preferable one when the travel of tape is considered.

Although the old "U" loading type recorder has advantages of the stability of the travelling system and of the simple construction thereof, the travelling system thereof is large in size because a large loading ring is located which has a certain inclination corresponding to the lead angle at the outlet side of the drum, and because the capstan motor must also maintain the same inclination as above-mentioned. As a result, it is difficult to provide a compact and a light-weight of the product.

The new "U" loading type recorder which has been proposed to overcome the above-mentioned drawback is constructed to take up the tape at the inlet side of the rotary drum. The outlet side of the rotary drum is disposed in parallel with the base plane of the deck. By this construction, the diameter of the loading ring can be reduced. The loading ring and the capstan motor are horizontally disposed. As a result, there is an advantage of greatly reducing the total size of the travelling system as compared with that of the old "U" loading type recorder. In this new "U" loading type recorder, however, at least three fixed and inclined posts are disposed at the inlet side of the rotary drum. Consequently, the travelling load of tape is increased, as compared with that of the old "U" loading type recorder. This becomes an obstacle to a smooth and stable travel of the tape. In order to overcome such problem, there is a need to provide a separate device for reducing the load acting on the rotating parts of the travelling system and for providing a stable travelling of the tape. However, the provision of such device makes the construction of travelling system complicated, thereby causing the cost of manufacture to be increased.

In the "M" loading type recorder, tape loading is effected by a pair of inclined posts horizontally guided to the inlet side and outlet side of the rotary drum. Accordingly, there are advantages of providing a compact travelling system and of simplifying the construction, as compared with those of the above-mentioned type recorders. In this type of recorder, however, the travel of tape is guided by a pair of inclined posts having a relatively large inclination, thereby causing the take up angle of tape to be enlarged. Thereby, the "M" loading type recorder is more undesirable than the above-mentioned other type recorders, when a travelling load is considered. The use of a separate impedance roller for overcoming the above-mentioned drawback also causes the construction of travelling system to be complicated and thereby the cost of manufacture to be increased.

Moreover, each inclined post is a moveable post which is not fixed to the inlet or outlet side of the drum. Accordingly, each inclined post has to be fixedly and accurately held at a predetermined position thereof. However, an accurate positioning of the assembly of inclined posts is relatively difficult. This becomes an obstacle to a stable travel of the tape.

SUMMARY OF THE INVENTION

Accordingly, the present invention has been made to overcome the problems encountered in conventional video tape recorders as above-mentioned and has for its object to provide a tape loading device for a tape recorder enabling the travelling load of tape to be minimum and thereby the travel of tape to be smooth and stable throughout the travelling system, wherein among several guide posts arranged around an inclined rotary head drum to guide a drawing and travelling path of the tape, only one is a fixed post which is inclined with respect to the direction of the travelling tape and disposed at an outer area between the tape supplying side of the tape cassette and the tape inlet side of the rotary drum, while the remainder are rotatable posts which are vertically disposed with respect to the direction of the travelling tape.

In accordance with the present invention, a tape loading device for a video tape recorder comprises a deck having a front-upper surface for loading a tape cassette thereon and an inclined rotary head drum disposed at the center portion of said deck, said drum having a helical type guide. The tape loading device comprising: a load plate disposed around said rotary drum and provided with a main guideway extending substantially throughout the length of said plate and a by-pass way branching out at one side of said main guideway, said loading plate having a predetermined inclination; upper and lower loading rings disposed between the upper surface of said deck and the lower surface of said loading plate; two over-stroke absorbing units mounted on respective surfaces of both loading rings; a lead base connected to said overstroke absorbing unit mounted on the upper loading ring and guided along said main guideway to travel to a predetermined position thereof, said lead base having a front-upper surface carrying a rotatable post thereon, a rear-upper surface carrying a rotatable post thereon, and an inclined surface disposed between said front-and rear-upper surfaces and provided with a hole; a trailer base connected to said overstroke absorbing unit mounted on the lower loading ring and guided along said main guideway and then said by-pass way to travel to a predetermined position thereof, said trailer base having a front-upper surface carrying a rotatable post thereon, and an inclined surface disposed between said front-and rear-upper surfaces, said inclined surface carrying a fixed and inclined post thereon; two stoppers disposed respectively on the main guideway and the by-pass way at respective final positions of the lead base and the trailer base and adapted to stop a travelling of said lead base and said trailer base; one of said rotatable posts of the trailer base being vertically disposed with respect to the base plane of the deck in the preloading state of the tape, so that the tape travelling between said rotatable post and the tape supplying area of the tape cassette is horizontally fed with respect to the base plane of the deck; and the other one of said rotatable posts of the trailer base and both rotatable posts of the lead base being vertically positioned with respect to the inclined surface of said loading plate, so that they have respective inclinations and orientations corresponding to the direction of the tape coming in the inlet side of the rotary drum.

By this arrangement, all of guide posts can be used as rotatable posts. On the other hand, only one guide post is a fixed post which is disposed at the position where the tape horizontally fed from the tape supplying area of the tape cassette changes its path to travel in an upward incline. The fixed post is mounted on the middle portion of the trailer base and inclined to make the inclination and the take up angle minimum. As a result, it enables the travelling load of tape to be minimum and thereby the travel of tape to be smooth and stable throughout the travelling system. Thereby, it is possible to provide a compact and chief V.T.R.

BRIEF DESCRIPTION OF THE DRAWINGS

The present invention can be more fully understood from the following description when taken in conjunction with the accompanying drawings, in which.

DETAILED DESCRIPTION OF THE PREFERRED EMBODIMENT

Figure 1:
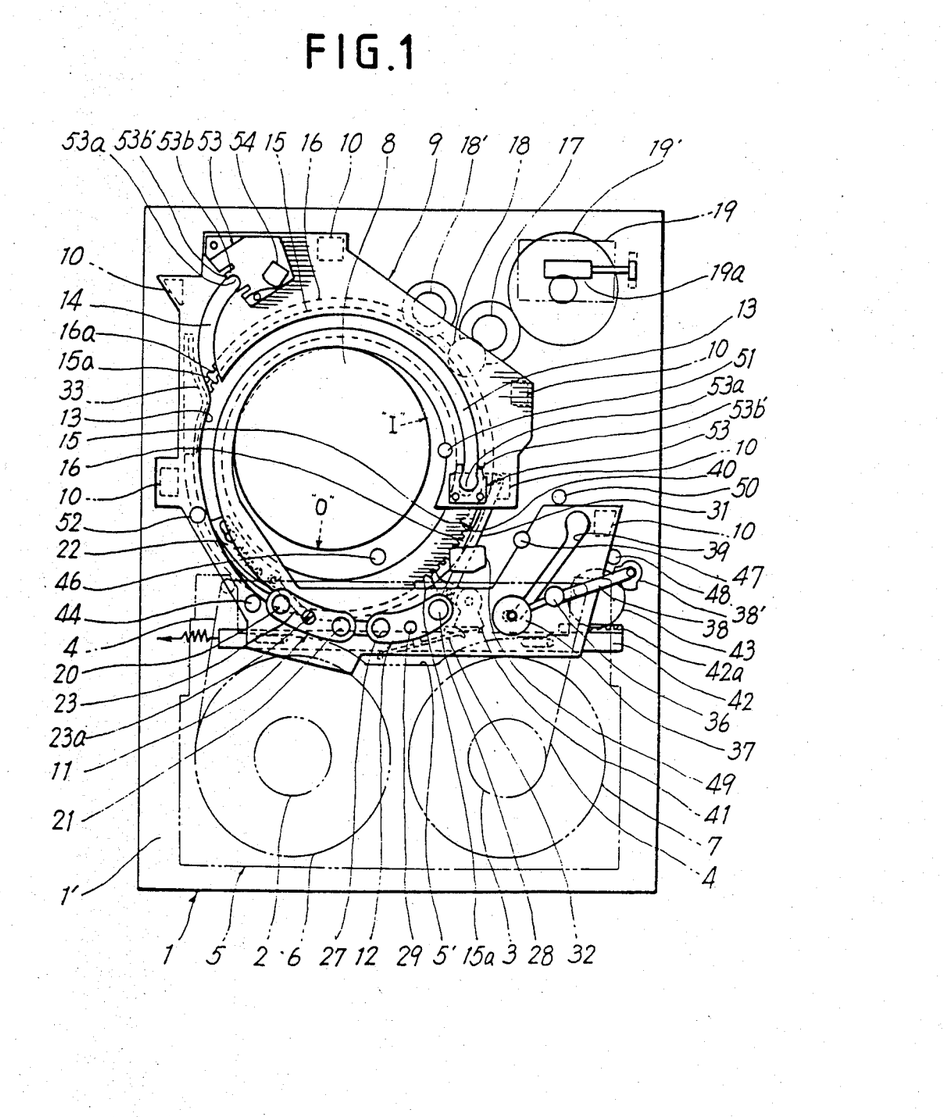
FIG. 1 is a plan view illustrating an arrangement of the device under the condition before a loading of tape of the present invention.
Figure 2:
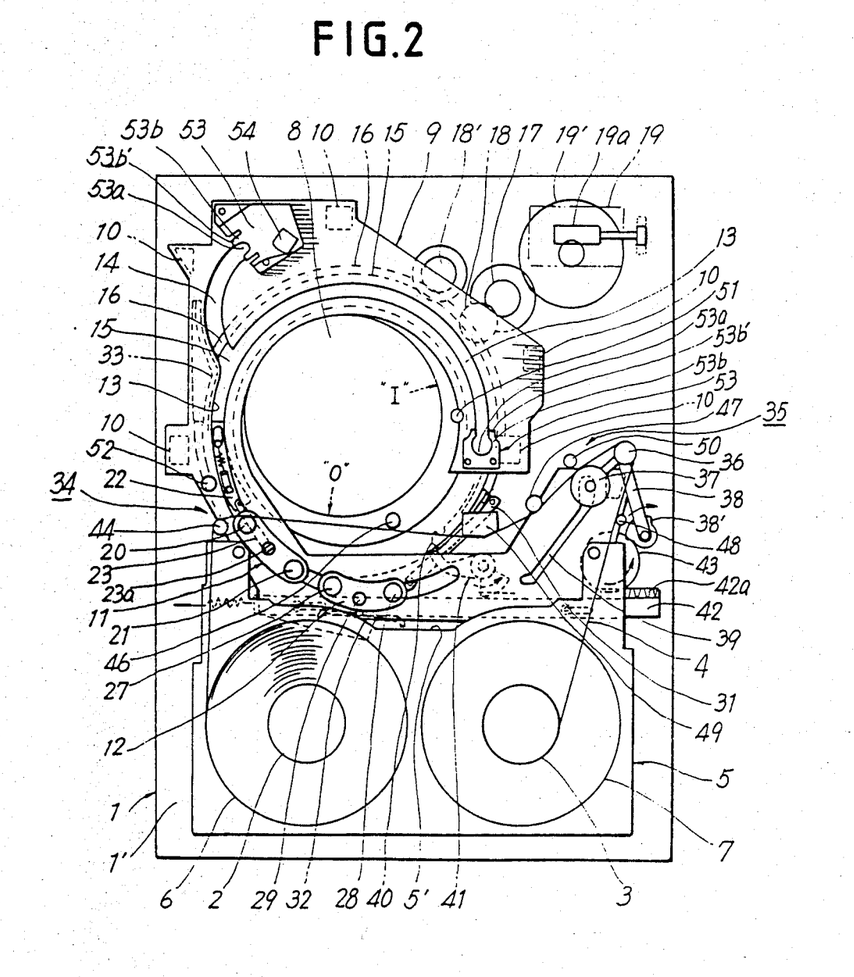
FIG. 2 is a plan view showing a preloading condition of the device of the present invention.

The drawings as shown in FIGS. 1,2,3 and 7 illustrate an embodiment of the present invention applied to a video tape recorder (hereinafter referred to as a V.T.R.). FIG. 2 is a plan view illustrating an arrangement of V.T.R. according to the present invention under the condition before a loading of tape is commenced. Reference numeral 1 denotes a rectangular deck, which includes a supply reel table 2 and a takeup reel table 3 disposed at the front side of the upper portion thereof. A tape cassette 5 containing a tape 4 is loaded on the deck 1, in parallel with a base plane 1' of said deck 1, such that a supply reel 6 and a takeup reel 7 of the tape cassette 5 engage with the tables 3 and 4, respectively.

At the central portion of the deck 1 is disposed a drum 8 including a rotary magnetic head and a helical-type tape guide, which drum will be referred to as a rotary drum, hereinafter. The rotary drum 8 is inclined at a certain angle with respect to the base plane 1' of the deck 1.

Reference numeral 9 denotes a laoding plate which is one of the essential elements of the of the present invention device. The loading palte 9 having a certain shape is fixedly supported on respective top ends of several supporting bosses 10 which are vertically mounted on the upper surface of the deck 1 around the periphery of rotary drum 8. Bosses 10 have different vertical lengths from one another, so as to provide a certain inclination of the loading plate 9 supported on said bosses, in such a manner that the height of loading plate 9 is gradually increased, as extending from the intermediate portion thereof to the one end thereof, in similar to the inclination of the rotary drum 8 at an inlet portion I thereof. Due to such inclination, the loading plate 9 importantly functions to provide the predetermined inclination of each guide post, when moveable bases, i.e., a lead base 11 and a trailer base 12 reach the final position thereof, as will be described hereinafter.

Reference numeral 13 denotes a main guideway formed in the shape of an arc at the loading plate 9 and substantially extended throughout the length of said loading plate 9. The main guideway 13 functions to guide a travelling path of each moveable base. One end of the main guideway 13 is disposed in an opening 5' of the tape cassette 5 and provides initial positions of both moveable bases 11 and 12, at which said bases are located prior to the commencement of moving thereof. The other end of main guideway 13 is also disposed at the other end of loading plate 9, that is, the outside of an intermediate portion of the rotary drum 8 between a tape inlet side I and a tape outlet portion 0 thereof and provides a final stop position of the lead base 11 in full-loading the tape.

At one side of the main guideway 13 formed as above-described, that is, an intermediate portion thereof where an upward inclination of the loading plate 9 is commenced, an arc-shaped by-pass way 14 is formed to be outwardly shunted from said main guideway 13 at a certain angle. The by-pass way 14 extends to a vicinity of one corner of the deck 1.

Between the lower surface of the loading plate 9 and the upper surface of the deck 1, the upper and lower loading rings 15 and 16 are arranged to be uniformly spaced from each other. The upper and lower loading rings 15 and 16 have, at their peripheries, respective series of gear teeth 15a and 16a.

Reference numeral 19 denotes a loading motor for driving said upper and lower loading rings 15 and 16, 19a denotes a worm driven by the rotation of the motor 19 and adapted to rotate a planet gear 19', 18 is a loading gear driven by a gear 17 engaging with said planet gear 19' and adapted to rotate upper loading ring 15, and 18' denotes double step gear driven by a rotation of said upper loading ring 15 and adapted to rotate lower loading ring 16.

Although not shown in the drawings, an actuator unit is arranged at one side of the gear 19'. The actuator unit functions to press a pinch roller 42 against a capstan 50, to provide a braking action depending upon each operating mode, to operate a tension post, or to select an operating mode of reel driving mechanism. By this arrangement, the upper and lower loading rings 15 and 16, and the actuator unit can be selectively driven by a common loading motor 19.

Figure 5:
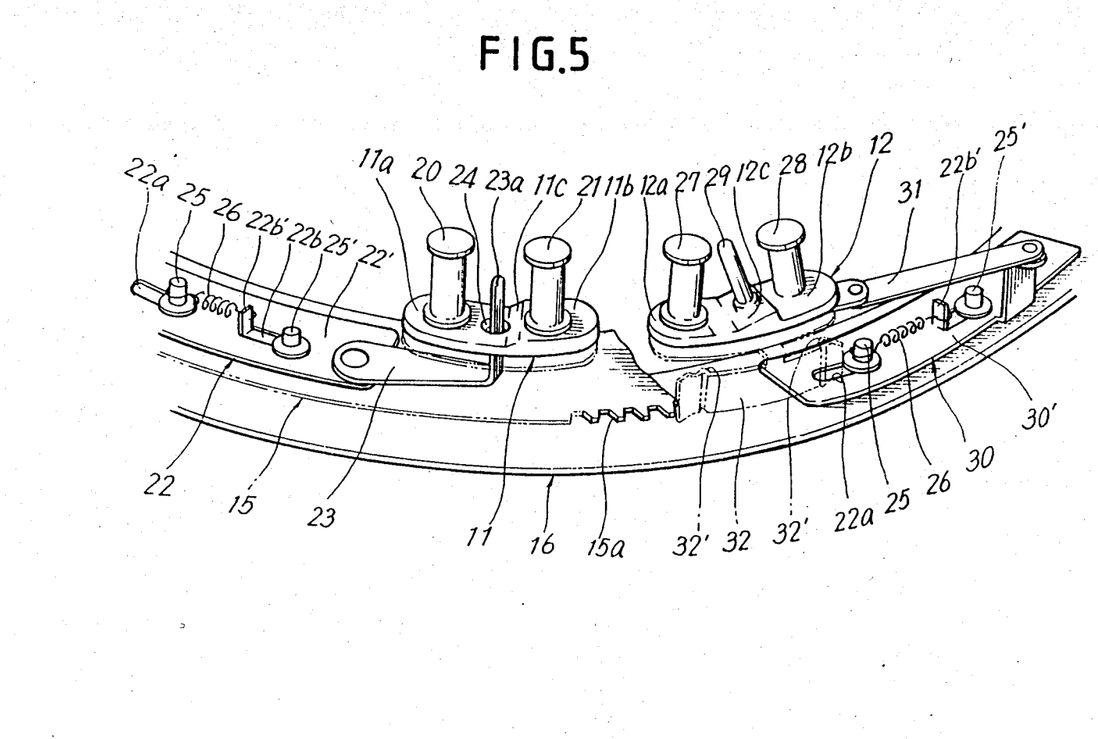
FIG. 5 is an enlarged perspective view showing the condition under which both moveable bases are disposed on upper and lower loading rings, respectively.

As the upper and lower loading rings 15 and 16 rotate, the lead base 11 and the trailer base 12 travel along the main guideway 13 and the by-pass way 14. As shown in FIG. 5, the lead base 11 includes stepped upper surfaces 11a and 11b having different heights with each other, which surfaces will surfaces will are referred to as front-and rear-upper surfaces respectively, hereinafter, and an inclined surface 11c formed between the front-upper surface 11a and the rear-upper surface 11b. Similarly, the trailer base 12 also includes stepped upper surfaces 12a and 12b having different heights with each other, which are referred to as front- and rear upper surfaces respectively, hereinafter, and an inclined surface 12c formed between the front-upper surface 12a and the rear-upper surface 12b. On the front-upper surface 11a and the rear-upper surface 11b, two rotatable posts 20 and 21 are vertically mounted, respectively. At the intermediate portion of the lead base 11 between said rotatable posts 20 and 21, a hole 24 is perforated, through which an upwardly curved end 23a of an operating lever 23 is loosely inserted. The operating lever 23 is connected to a rear end of an over-stroke absorbing unit 22 located on the upper surface of upper loading ring 15. The lead base 11 which travels along the inclined main guideway 13 by a normal rotation of the loading ring 15, is supported and guided by the curved end 23a to be freely displaced upwardly and downwardly. The curved end 23a has a sufficient length to avoid a removal thereof from the hole 24 of lead base 11 at an uppermost position of the lead base 11.

The over-stroke absorbing unit 22 includes a base plate 22' having two longitudinally formed slots 22a and 22b at both sides thereof, respectively (FIG. 5). Inserted into respective slots 22a and 22b are tow holding pins 25 and 25' fixed vertically on the upper loading ring 15 and spaced with each other at a certain distance. Thereby, the base plate 22' is mounted on the upper loading ring 15 to be slightly slideable thereon. An upwardly curved extension 22b' is formed at an inner end of rear slot 22b. Between this extension 22b' and a front holding pin 25, a coil spring 26 is attached, which absorbs and thus relieves an impact and an over-stroke resulted from stopping by a stopper as described later, when the lead base 11 travelling by a pulling of the operating lever 23 reaches a final position thereof on the main guideway 13.

On the other hand, the trailer base 12, which is initially positioned at the rearward of the lead base 11, that is, at one end of the main guideway 13 disposed in an opening 5' of the tape cassette 5, has two rotatable posts 27 and 28 mounted vertically on the front-and rear-upper surfaces 12a and 12b thereof, respectively. The trailer base 12 also has an inclined post 29 fixedly mounted on the inclined surface disposed between the upper surfaces 12a and 12b. While the front rotatable post 27 is vertically positioned with respect to the front-upper surface 12a of the trailer base 12, the rear rotatable post 28 is inclined at a certain angle with respect to the rear-upper surface 12b, at the initial position of the trailer base 12, where the base is located prior to the commencement of moving thereof. The inclination of the rotatable post 28 corresponds to that of the by-pass way 14 on which the rotatable post 28 travels, so that the rotatable post 28 is vertically positioned with respect to the base plane 1' of the deck 1 under a full loading condition when the trailer base 12 reaches its final position. The trailer base 12 is connected to a base plate 30' of an over-stroke absorbing unit 30 mounted on the upper surface of lower loading ring 16, by means of an operating lever 31 connected to said unit. The over-stroke absorbing unit 30 has the same construction as that of the over-stroke absorbing unit 22 on the lead base 11.

Reference numeral 32 which is indicated by a dotted line denotes a guide plate which is integrally formed with a bottom plate 12' supporting the trailer base 12 and downwardly extended from the outer portion of said bottom plate 12' (FIG. 1). The guide plate 32 has contacts 32' protruding from both ends thereof, respectively.

At one side of the upper surface of the deck 1 where the branch area between the main guideway 13 and the by-pass way 14 is located, a guide rail 33 is disposed, which has the shape corresponding to that of the branch area. By this construction, when the trailer base 12 which travels together with the lower loading ring 16 in the process of a loading operation reaches the guide rail 33, both contacts of the guide palte 32 come into contact with the outer surface of guide rail 33 and whereby the guide plate 32 is guided to travel along the guide rail 33. Thereby, the trailer base 12 is ensured to change its path and travel along the by-pass way 14.

Described heretofore is the arrangement of the tape loading device according to the present invention and the operation thereof under the condition when a loading operation has not yet been commenced. Now, an operation of the loading device of the present invention in the process of a loading operation is described.

FIG. 2 shows a preloading condition under which a tape cassette 5 is preloaded on the reel tables 2 and 3 of the deck 1, prior to a full loading thereof. This preloading condition is carried out, simultaneously with an insertion of the tape cassette 5 into the deck 1. This is brought out by the rotations of the loading rings 15 and 16 resulted from a driving of the loading motor 19. At the tape returning ara 35, there is a tape drawing unit which comprises a rotatable guide post 36, a pinch roller 37 hinged to said guide post 36, and an operating lever 38 driving the guide post 36 and the pinch roller 37. The pinch roller 37 is guided along a predetermined path by a separate guideway 39 formed at the one end of the loading plate 9, so as to be positioned at the one side of the loading plate 9, that is, at the outward of the initial position of the trailer base 12 on the main guideway 13.

The operation of lever 38 driving the guide post 36 and the pinch roller 37 is carried out by an intermittent driving unit which comprises a pivotable cam lever 40 disposed above the upper surface of the lower loading ring 16, said lever 40 having at one end a cam engageable with the front edge of base plate 30', a snail gear 41 fixedly connected to the other end of the lever 40, a functioning plate 42 engaging with a snail gear 41 and having at one end a rack 42a, and a pinch gear 43 engaging at one side with said rack 42a and at the other side with a fan-shaped gear 38' fixedly mounted to the operating lever 38. As the trailer base 12 travels from the initial position thereof along the main guideway 13, the cam of the cam lever 40 is pushed by the base plate 30' travelling together with the trailer base 12, to pivot the cam lever 40. This pivoting of cam lever 40 brings a rotation of the snail gear 41 which makes the functioning plate 42 to move in the direction as indicated by an arrow in FIG. 2. By this movement of the functioning plate 42, the fan-shaped gear 38 rotates by means of the pinch gear 43, so that the operating lever 38 pivots in clock-wise. This pivoting of the operating lever 38 causes the guide post and the pinch roller 37 to travel along the guideway 39, so that the tape 4 from the tape cassette 5 is drawn to the tape returning area 35. The travel of both guide post 36 and pinch roller 37 is carried out in parallel with the base plane 1' of the deck 1. Accordingly, the only requirement is to uniformly maintain each vertical level of said guide post 36 and pinch roller 37 with respect to the base plane 1', without the troublesome necessity of accurately positioning said guide post 36 and pinch roller 37. As a result, this provides a simplification of the arrangement at the tape returning area and an advantage of reducing the total height thereof.

Simultaneously with the process of preloading operation at the tape returning area 35, both moveable bases 11 and 12 travel along the main guideway 13 to a ceratin distance. Accordingly, the tape 4 is also horizontally drawn to a certain position by the guide post 20 of the lead base 11 at the tape supply area 34. Thus, a tape preloading operation is carried out at both areas 34 and 35. The tape preloading operation at the tape returning area 34 is controlled by a lever (not shown) sensing a preloading of tape and being actuated by a rotation of the lower loading ring 16, a sensing switch (not shown) disposed at the one end of said lever, said switch being actuated by a rotation of the vertical post 44, and a later-described stopper.

The drawn tape 4 under the preloading condition contacts in seuqence with the fixed vertical post 44, the front rotatable post 20 of the lead base 11, the fixed vertical post 46 disposed at the outlet portion 0 of the drum 8, then another fixed vertical psot 47, the rotatable guide post 36, the pinch roller 37, and then the fixed post 48 disposed at the tape returning area. In this state, it is possible to automatically find a selected operating position on the tape 4, if desired, by positioning a cue head 49 between both fixed vertical posts 46 and 47, proceeding a fast forwarding operation or a rewinding operation of the tape 4, and sensing a signal recorded on a cue track of the tape 4. By this arrangement, it is possible to greatly reduce a travelling load of the tape generated in a fast travelling thereof, as compared with the case where the operation for finding a selected proceeding position of the tape is carried out in a full loading condition. This makes wear of the tape at the contact area thereof reduced.

Where the cassette 5 is provided with a tape guide therein, both fixed posts 44 and 48 disposed at the tape returning area and the tape supplying area respectively also function as tape guides.

Figure 3:
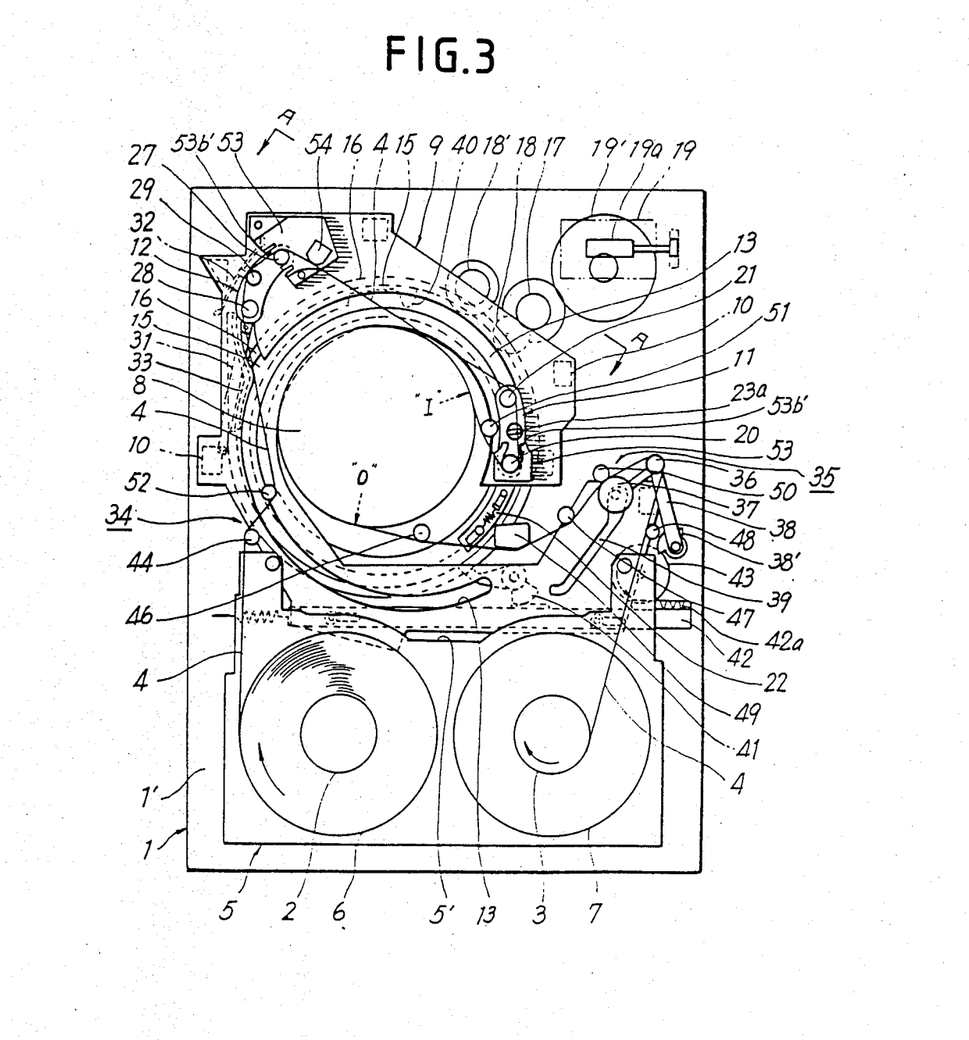
FIG. 3 is a plan view showing a full loading condition of the device of the present invention.

Reference numeral 50 denotes a capstan, against which the pinch roller 37 is pressed at a predetermined pressure by means of a separate actuator, in the reproduction mode or the recording mode of the V.T. R. (FIG. 3). The modes are effected under the full loading condition of the tape. In this state, a travelling velocity of the tape is controlled by a rotation of the capstan motor (not shown).

To make the process from the preloading condition as shown in FIG. 2 to the full loading condition, the upper loading ring 15 and the lower loading ring 16 rotate. By such rotations of both loading rings, both moveable bases 11 and 12 travel along the main guideway 13 and the by-pass way 14, respectively, to feed the tape 4 to the predetermined position shown in FIG. 3. In this case, the lead base 11 following the operating lever 23 of the over-stroke absorbing unit 22 on the upper loading ring 15 is gradually raised due to the inclination of the main guideway 13, as it passes the branch area between the main guideway 13 and the by-pass way 14 and then travels along the main guideway 13. Accordingly, the distance between the lead base 11 and the upper loading ring 15 is gradually increased. Because the curved end 23a of the operating lever 23 vertically extended by a certain length is inserted through the hole 24 of the lead base as described hereinbefore, the lead base 11 which travels on the inclined portion of the main guideway 13 by a rotation of the upper loading ring 15 is gradually raised along the end 23a of the operating lever 23 irrespective of the inclination of the main guideway 13. When the lead base 11 reaches the final position thereof on the main guideway 13, the end surface of said curved end 23a of the operating lever 23 is substantially flush with the upper surface of the lead base 11.

On the other hand, when the trailer base 12 travelling together with the lead base 11 reaches the branch area of the main guideway 13, the guide plate 32 begins travelling along the guide rail 33, thereby causing the trailer base 12 to travel along the by-pass way 14. When the trailer base 12 reaches the final position thereof on the by-pass way 14, the final positions of respective guide posts 28, 29, 27, 21 and 20 are referred to as the first, the second, the third, the fourth, and the fifth guide posts respectively. Thus, the full loading of the tape 4 is completed. At the middle position between the fifth rotatable post 20 and the tape inlet portion I of the drum 8, a separate fixed and inclined post 51 is positioned, which finally guides the feeding of tape 4 coming in the inlet poriton I of the drum via each guide post as above-mentioned. The post 51 has the predetermined inclination and orientation to guide the tape 4 in the direction tangential to the tape inlet portion I of the drum 8.

Figure 4:
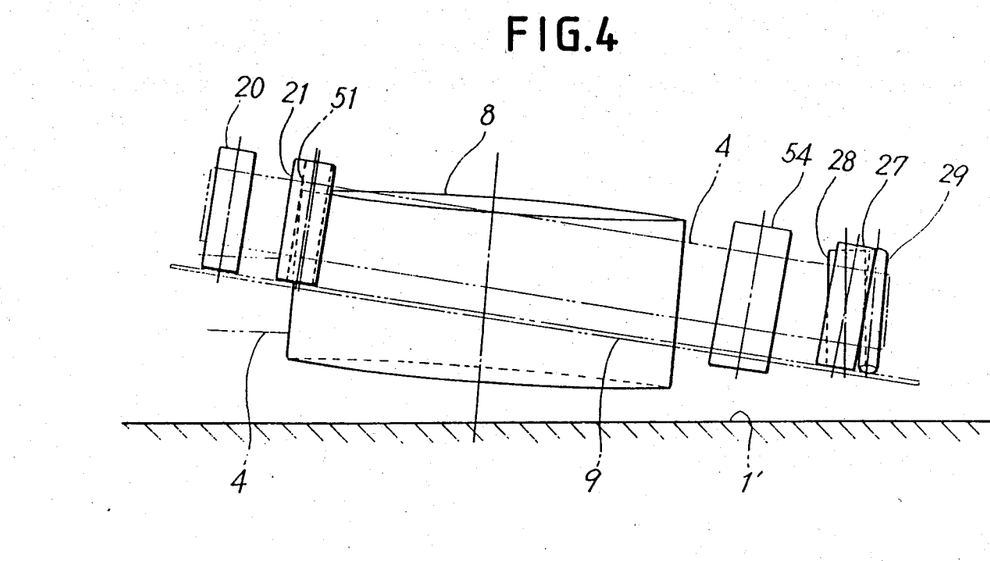
FIG. 4 is a side view taken along a line A—A of FIG. 1, showing a coarrangement among guide posts, a rotary drum, and a tape under the full loading condition.

Although the loading plate 9 which sets all positions of respective moveable bases 11 and 12 and respective guide posts 28, 29, 27, 21 and 20 mounted on said bases as the full loading of the tape is completed, is inclined at certain angles with respect to the base plane 1' of the deck 1 and the travelling path of the tape along the drum 8, respectively, the first rotatable post 28 of the trailer base 12, which is located at the final position on the by-pass way 14 between the inclined portion and the plan portion of the loading plate 9, is vertically positioned with respect to the base plane 1', by virtue of its inclination. Accordingly, the post 28 horizontally guides the tape coming out of the tape outlet area 34. On the other hand, the third post 27 on the trailer base 12 located at its final position on the by-pass way 14, and the fourth and fifth posts 21 and 20 located at their final positions on the main guideway 13 are vertically positioned with respect to the inclined surface of the loading plate 9 as shown in FIG. 4. That is, each of the third, the fourth and the fifth posts 27, 21 and 20 has the inclination corresponding to the feeding direction of the tape 4 taken up on a helical tape guide of the drum 8. Each of said three posts 27, 21 and 20 has the identical inclination and orientation to those of the inclined posts 51 disposed at the inlet side I of the drum 8. By such arrangement, the tape 4 passing said posts 27, 21 and 20 has the inclination and orientation corresponding to those of the travelling path of the tape coming in the inlet portion I of the drum 8 via the inclined post 51. Thereby, each of said posts 27, 21 and 20 are able to rotate, enabling the travelling load of the tape 4 to be greatly reduced.

On the other hand, the fixed and inclined post 29, that is, the second post is located at the position between the first post 28 and the third post 27 where the tape 4 horizontally fed from the tape supplying area of the tape cassette 5 via the first post 28 changes the path thereof to travel in an upward incline along the inclined portion of the loading plate 9. This post 29 has a predetermined inclination to sufficiently reduce the take up angle and the inclination of the tape travelling past the post 29. By such reduction, the travelling load of the tape is correspondingly reduced. And also, undesirable longitudinal vibration of the tape is avoided.

Reference numeral 54 denotes an erasing head positioned throughout the width of the tape. The erasing head may be simply mounted on the inclined surface of the loading plate 9.

Reference numeral 52 denotes a tension post for controlling a tension of the tape 4 in the full loading thereof. The tension post 52 always constantly maintains the tension of the travelling tape 4, by sensing the tension acted on the tape and control the acting force of a tension band brake (not shown) taken up on the supply reel tabel 2 of the deck 1.

After the full loading of the tape, i.e., the helical taking up of the tape on the drum 8 is completed by positioning each of guide posts 28, 29, 27, 21 and 20, it is most important that each of said guide posts be fixedly and continuously maintained at a predetermined position thereof, so as to uniformly and stably maintain the travel of the tape in the reproducing or recording operations of the V.T. R. In such operations, the accuracy of positioning said guide posts does not especially influence the stable travel of the tape. However, it is possible to ensure the maintenance of constant travelling path of the tape 4, so far as all guide posts 28, 29, 27, 21 and 20 are always vertically positioned with respect to the direction of feeding the tape 4. Accordingly, it is needed to provide a holding units for both moveable bases 11 and 12, respectively.

The present invention provides simple and chief holding units which can continuously maintain the fixed states of both bases 11 and 12, respectively. The holding unit for the lead base 11 has the identical construction to that for the trailer base 12. Hereinafter, only the holding unit for the lead base 11 is described in detail, by referring to the drawings.

Figure 6:
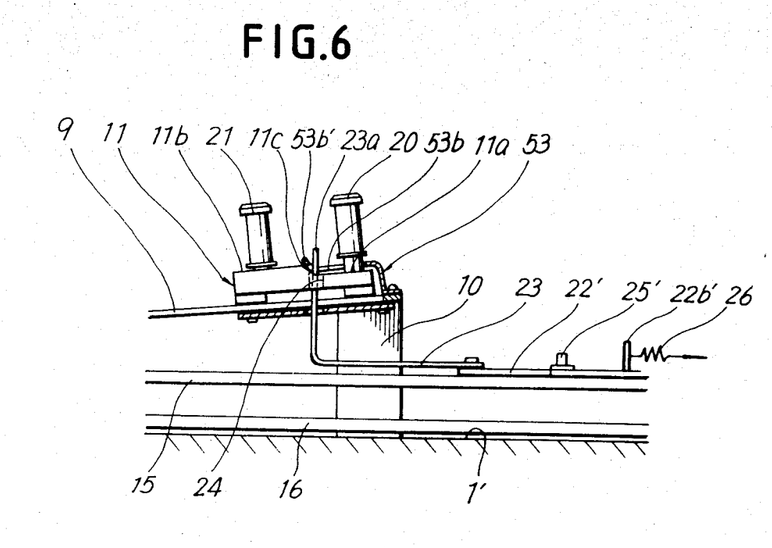
FIG. 6 is an enlarged perspective view showing the condition under which a lead base is held in a stopper.
Figure 7:
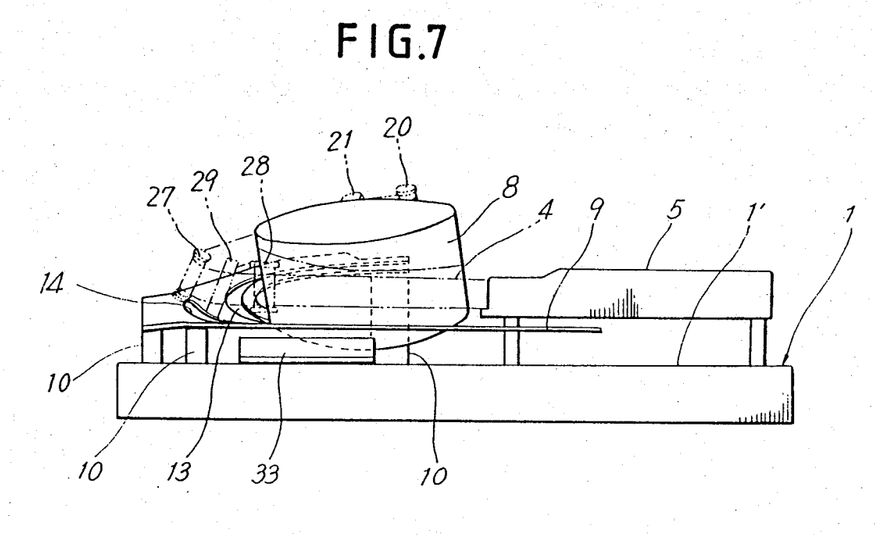
FIG. 7 is a schematic side perspective view of the device according to the present invention.

FIG. 6 is a partial sectional view showing the condition under which the lead base 11 is held by a stopper 53 of the holding unit. The stopper 53 consists of an elastic plate having a cross-section "ㄱ" shape. The stopper 53 is fixed at one end thereof to the upper surface of the loading plate at the outward of the end of the main guideway 13. The stopper 53 also has the other end inwardly curved at a middle height between the height of the front-and rearupper surfaces 11a and 11b of the lead base 11 disposed at its final position on the main guideway 13 and then extended towards the main guideway 13 and in parallel with the inclined upper surface of the loading plate 9.

This end of stopper 53 has at the middle thereof an inwardly opened groove 53a into which the fifth rotatable post 20 can be freely inserted. Both tongue-shaped piece 53a defining the groove 53a there between are upwardly curved at their end, respectively. The curved end of each tongueshape piece 53b, which is indicated by a reference numeral 53b' is in contact with and raised by the inclined surface 11c formed between the front- and rear- upper surfaces 11a and 11b of the lead base 11, when the lead base 11 reach its final position. In this state, the curved end 53b' subjects the inclined surface 11c to a certain pressure, due to the elasticity by itself. Accordingly, the lead base is uniformly subject to a pressure through-out all areas thereof, i.e., the front, rear, left and right portiosn thereof. As a result, the lead base 11 can be stably and positively held at its predetermined position.

The holding unit for holding the lead base 11 in the preloading condition as described hereinbefore can also apply the principle of the above-mentioned stopper. In the present invention, it needs to provide a stopper with more higher elasticity, because the stopper has to press only one side of the lead base 11, so as to allow the advancing movement of the lead base 11 in the process of full loading operation. Accordingly, if the advancing force of said lead base 11 excesses a certain limitation, the lead base 11 can advance by forciblylifting the stopper by the rea- upper surface 11b thereof.

Where both loading rings 15 and 16 and the actuator are separately driven by the common loading motor 19, the loading rings 15 and 16 are locked to rotate no longer when they reach their full loading positions. At the same time, a cam gear (not shown) disposed within the actuator rotates. Then, a mechanism of each operating part is actuated by a lever (not shown) connected to the above-mentioned cam. A rotary-type mode switch (not shown) is directly connected to the cam, so that the cam can function to transmit a mode of the actuator to a system control circuit of the V.T.R. Such arrangements have been already utilized in various V.T.R., so that a detailed description thereof is omitted herefrom.

On the other hand, when the tape is displaced from the full loading position to the preloading or unloading position, the loading motor 19 reversely rotates, causing the actuator to be displaced to the locking position thereof. At the locking position, the cam gear of the actuator is locked, so that the upper and lower loading rings 15 and 16 are subject to the load of the loading motor 19. Accordingly, the upper and lower loading rings 15 and 16 rotate in anticlockwise, thereby causing both lead base 11 and trailer base 12 to rotate together therewith. At this time, the tape supply reel 2 also revesely rotate to take up the tape. Thereby, a hanging down of the tape at the inlet side of the drum 8 is avoided. Each of guide posts 20, 21, 27, 28, and 29 returns to the preloading state shown in FIG. 2.

This preloading condition provides an identical stop mode to that of the preloading condition effected by inserting the tape cassette 5 into the deck 1 of the V.T.R. In this state, pushing an operating key, i.e., an eject button makes all of posts 44, 20, 21, 27, 29, 28 and 36, and the pinch roller 37 to completely return to respective initial positions thereof at which they are disposed in the opening of the tape cassette 5. As described hereinbefore, such operations are carried out by a reverse rotation of each loading ring. As the reverse rotation of each loading ring is continuously effected after the preloading condition is made, an operating level (not shown) operably connected to each loading ring releases the locking of the cassette holder, then causing said cassette holder to be ejected outwardly. Thus, the tape cassette 5 is unloaded from the V.T.R.

As described heretofore, the tape loading device of the present invention is constructed to devide several guide posts for guiding the travelling path of the tape into two groups mounted on both moveable bases, respectively, and to arrange said both groups of guide posts at different positions from each other, that is, at respective final positions of both bases on the main guideway and the by-pass way, unlike conventional loading device wherein all guide posts are arranged around the drum and uniformly spaced from one another. According to the present invention, the tape horizontally travelling at the tape supplying area of the cassette changes its path to travel in an upward incline via only one inclined post. Each of guide posts guiding the upwardly travelling-tape is vertically positioned with respect to the loading plate having an inclination corresponding to that of the tape. By this arrangement, the construction and the arrangement of each post are simplified. And also, all of guide post can be used as rotatable posts. As a result, it enables the travelling load of tape to be minimum and thereby the travel of tape to be smooth and stable throughout the travelling system. Thereby, it is possible to provide a compact and chief V.T.R.

What is claimed is:

1. A tape loading device for a video tape recorder comprising:
    a deck having an upper surface for loading a tape cassette on the front portion thereof;
    an inclined rotary head drum disposed at the center portion of said deck, said drum having a helical tape guide;
    a loading plate disposed around said rotary drum having a lower surface and provided with a main guideway extending substantially throughout the periphery thereof and a by-pass way branching out at one side of said main guideway said loading plate having a predetermined inclination;
    upper and lower loading rings disposed between said upper surface of said deck and said lower surface of said loading plate;
    means for driving said loading rings through a plurality of gears, the driving force from said means being transferred to said upper loading ring through a plurality of gears including an upper loading gear, and to said lower loading ring through a lower loading gear which is interlocked with said upper loading gear according to the rotation of said upper loading ring being progressed;
    upper and lower over-stroke absorbing units mounted on respective surfaces of both loading rings;
    a lead base connected to said upper over-stroke absorbing unit mounted on said upper loading ring guided along said main guideway for traveling to the final travel end thereof, said lead base having a front-upper surface carrying a first rotatable post thereon, a rear-upper surface carrying a second rotatable post thereon, and an inclined surface disposed between said front and rear upper surfaces and provided with a hole;
    a trailer base connected to said over-stroke absorbing unit mounted on said lower loading ring and guided first along said main guideway and then along said by-pass way by traveling to the final travel end thereof, said trailer base having a front-upper surface carrying a first rotatable post thereon, a rear-upper surface carrying a second rotatable post thereon, and an inclined surface disposed between said front and rear upper thereon; and
    two stoppers disposed respectively on the final travel ends of said main guideway and said by-pass way and adapted to stop the travel of said lead base and said trailer base;
    said lead and trailer bases moving from a preload position to a full load position with related posts according to various loading positions thereof engaging the tape in a cassette and drawing the tape to full load positions on and relative to said head drum, said second rotatable post of the trailer base being vertically disposed with respect to the base plane of the deck in the full loading state of the tape so that the tape traveling between said vertical second rotatable post and the tape supplying area of the tape cassette is horizontally fed with respect to the base plane of the deck, said first rotatable post of said trailer base and both rotatable posts of said lead base being vertically positioned with respect to the inclined surface of said loading plate, so that they have respective inclinations and orientations corresponding to the direction of the tape coming in an inlet side of said rotary drum.

2. The tape loading device according to claim 1, wherein the stopper is provided with a tongue-shape piece, said piece being provided with a curved end portion, so that respective inclined surfaces of both bases are pressed against respective curved end portions of said pieces when said bases reach their final positions, thereby allowing said bases to be stably held at a predetermined positions thereof by pressures uniformly acting on all areas of the bases.

3. The tape loading device according to claim 1, wherein the over-stroke absorbing unit includes a base plate provided with front and rear slots through which front and rear holding pins fixed on each loading ring are loosely inserted, a spring disposed between said front holding pin and a supporting piece formed at one end of said rear slot, and an operating lever pivotably mounted on one side of said base plate and connected to each base, and wherein the lead base has a hole through which an upwardly curved end of said operating lever is slidably inserted, so that the lead base freely moves upwardly and downwardly, depending upon the inclination of the main guideway, as the upper loading ring rotates.

4. The tape loading device according to claim 1, wherein the trailer base includes a guide plate connected thereto by mans of a connecting piece, and the deck has a guide rail mounted on the upper surface thereof along the outside of the branch area over the main guideway and the by-pass way, said guide rail functioning to guide said guide plate of the trailer base therealong as the trailer base reaches said branch area, so that the trailer base travels along said by-pass way.

* * * * *